(12) United States Patent
Psaila (10) Patent No.: US 11,099,329 B1
(45) Date of Patent: Aug. 24, 2021

(54) OPTICAL APPARATUS AND METHOD (71) Applicant: OPTOSCRIBE LIMITED, Livingston (GB)

(72) Inventor: Nicholas D. Psaila, Livingston (GB)

(73) Assignee: OPTOSCRIBE LIMITED, Livingston (GB)

( * ) Notice: Subject to any disclaimer, the term of this patent is extended or adjusted under 35 U.S.C. 154(b) by 0 days.

(21) Appl. No.: 16/950,611

(22) Filed: Nov. 17, 2020

(30) Foreign Application Priority Data

Sep. 11, 2020 (GB) ...................................... 2014334

(51) Int. Cl.
| | |
|---|---|
| *G02B 6/36* | (2006.01) |
| *G02B 27/62* | (2006.01) |
| *G02B 6/42* | (2006.01) |
| *G02B 6/32* | (2006.01) |
| *G02B 6/30* | (2006.01) |
| *G02B 3/00* | (2006.01) |
| *G02B 6/26* | (2006.01) |

(52) U.S. Cl.
CPC ............ *G02B 6/3644* (2013.01); *G02B 6/30* (2013.01); *G02B 6/322* (2013.01); *G02B 6/4292* (2013.01); *G02B 27/62* (2013.01); *G02B 3/005* (2013.01); *G02B 3/0075* (2013.01); *G02B 6/262* (2013.01); *G02B 6/3636* (2013.01)

(58) Field of Classification Search
None
See application file for complete search history.

(56) References Cited

U.S. PATENT DOCUMENTS

| | | | | |
|---|---|---|---|---|
| 6,515,800 | B1 | 2/2003 | Border et al. | |
| 8,615,149 | B2 * | 12/2013 | Kim ..................... | G02B 6/4292 |
| | | | | 385/49 |
| 9,297,963 | B2 * | 3/2016 | Ohmura ............... | G02B 6/3885 |
| 9,983,365 | B2 * | 5/2018 | Childers .............. | G02B 6/3853 |
| 10,585,248 | B2 * | 3/2020 | Childers .............. | G02B 6/3853 |
| 2008/0144999 | A1 * | 6/2008 | Takeda ................. | G02B 6/3861 |
| | | | | 385/51 |
| 2012/0033920 | A1 * | 2/2012 | Haley .................. | G02B 6/3834 |
| | | | | 385/78 |
| 2012/0121218 | A1 * | 5/2012 | Kim ..................... | G02B 6/3885 |
| | | | | 385/14 |
| 2015/0226922 | A1 * | 8/2015 | Childers .............. | G02B 6/3885 |
| | | | | 385/79 |
| 2015/0247982 | A1 * | 9/2015 | Ohmura ............... | G02B 6/3885 |
| | | | | 385/76 |
| 2019/0361174 | A1 | 11/2019 | Smith et al. | |
| 2020/0326491 | A1 * | 10/2020 | Psaila .................... | G02B 6/32 |

* cited by examiner

*Primary Examiner* — Jerry Rahll
(74) *Attorney, Agent, or Firm* — Womble Bond Dickinson (US) LLP (57) ABSTRACT

Optical apparatus comprises:
a body comprising material;
a plurality of optical elements formed of the material of the body; and
a plurality of alignment holes formed in the material of the body,
wherein:
the alignment holes comprise fibre or other waveguide alignment holes aligned with one or more of the optical elements, and/or
the alignment holes comprise alignment holes configured to receive mechanical elements for fixing and/or aligning the body to at least one further body.

16 Claims, 5 Drawing Sheets

OPTICAL APPARATUS AND METHOD

FIELD

The present invention relates to optical apparatus and methods of manufacture of such optical apparatus, for example optical apparatus for routing, transmitting, receiving or manipulating optical signals using an array of optical elements.

BACKGROUND

Fibre arrays are commonly used in a wide range of fibre optic applications, and many of these additionally involve the combination of a fibre array (e.g. 1D or 2D array) with a microlens array. Typically the fibre array and lens array need to be carefully aligned and bonded to one another with sub-micron alignment accuracy, which can be a complex and time-consuming task. The fibre array and lens array may, for example, be provided or produced separately, and correct operation of the resulting combination will depend on the alignment and bonding of the fibre array and lens array being performed correctly and accurately.

SUMMARY

In a first aspect there is provided an optical apparatus comprising:
a body comprising material;
a plurality of optical elements formed of the material of the body; and
a plurality of alignment holes formed in the material of the body,
wherein the alignment holes comprise fibre or other waveguide alignment holes aligned with one or more of the optical elements, and/or
the alignment holes comprise alignment holes configured to receive mechanical elements for fixing and/or aligning the body to at least one further body.

The optical elements may comprise refractive, diffractive and/or reflective optical elements and/or metalenses.

The optical elements and the alignment holes may be formed by laser modification of the material and/or by laser ablation.

The forming of the optical elements and the alignment holes may comprise removing laser-modified material following the laser modification.

The laser modification of the material and/or the laser ablation may comprise a laser processing procedure that comprises holding the body in position using a sample stage and providing relative movement between a laser beam and the sample stage. Laser modification of material and/or laser ablation for formation of both the optical elements and the alignment holes may be performed during the same laser processing procedure.

The laser modification of material for formation of both the optical elements and the alignment holes may be performed without moving or removing the body with respect to or from the sample stage.

The sample stage may comprise any suitable mechanical arrangement for holding the sample in a desired position, for example a desired position with respect to the sample stage and/or a laser source, and/or for providing relative movement with respect to a laser beam produced by the or a laser source, for example in accordance with known laser processing techniques. The sample stage may comprise a planar structure to which the sample is attached.

The body may comprise a monolithic block of the material and the plurality of optical elements, and the alignment holes, may be formed in or of the material of the monolithic block.

The plurality of optical elements may comprise an array of optical elements, optionally a 1D or 2D array of optical elements.

The array may comprise a regular array of optical elements, with periodic spacing between the optical elements.

There may be non-periodic spacing between at least some of the optical elements.

The optical elements may be arranged to provide at least one of:
a) a collimator array, optionally for optical switching applications;
b) an expanded mode interface, optionally for a multi-channel fibre-optic connector;
c) a phased array, optionally for LiDAR or free-space optical communication;
d) aligned optics, optionally for optoelectronic applications, for example a transceiver or laser array.

The plurality of optical elements may comprise a plurality of lenses.

At least some of the lenses may comprise spherical lenses; and/or at least some of the lenses may comprise aspherical lenses.

At least one of the optical elements may be tilted with respect to a surface of the body.

The tilted optical element(s) may comprise an aspherical lens(es).

For the alignment hole(s) aligned with the tilted lens(es), an end face of the alignment hole may be tilted with respect to a longitudinal axis of the alignment hole.

The optical elements may be recessed below a surface of the material.

For at least some of the alignment holes, an end face of the alignment hole may be perpendicular to a longitudinal axis of the alignment hole; and/or
for at least some of the alignment holes, an end face of the alignment hole may be tilted with respect to a longitudinal axis of the alignment hole.

At least some of the alignment holes may have different diameters to at least some other of the alignment holes, thereby optionally to accommodate different sizes of optical fibres or waveguide devices.

The body may further include at least one channel connected to one or more of the alignment holes.

The at least one channel may be arranged to provide flow of adhesive or other filling and/or to provide flow of etchant.

The channel or, each of a plurality of the channels, may be connected to a respective plurality of the alignment holes.

For at least one of the alignment holes, said at least one of the alignment holes may extend from a surface of the body, and an associated one of the channels connected to said at least one of the alignment holes may extend to another surface of the body, optionally an opposite surface of the body.

Said another surface may be a surface on which the optical elements are present.

For at least one of the alignment holes, said at least one of the alignment holes may extend from a surface of the body, and an associated one of the channels connected to said at least one of the alignment holes may extend to the same surface of the body.

The alignment holes may comprise alignment holes configured to receive mechanical elements for fixing and/or aligning the body to at least one further body.

The alignment holes may comprise alignment holes configured to receive mechanical elements to form a stacked structure with a plurality of further bodies or devices.

The at least one further body may comprise an array of further optical elements, and the alignment holes may be arranged to provide a desired alignment between the plurality of optical elements and the array of further optical elements.

The array of further optical elements may comprise an array of emitters and/or receivers and/or light-emitting diodes (LEDs) and/or edge emitter lasers and/or VCSELS and/or comprises at least one photonic integrated circuit The material of the body may comprise glass.

The holes may have any suitable cross-sectional shape, for example but not limited to being circular. For example, the holes, or one or more of the holes, may have a cross-section that is irregular or regular in shape, for example circular, oval, triangular, or any suitable polygonal shape. The holes may be empty or wholly or partially filled. The holes may be cylindrical or have any other suitable three-dimensional shape.

In a further aspect, which may be provided independently, there is provided a method of forming an optical apparatus comprising laser processing a body comprising material for formation of a plurality of optical elements of the material of the body and a plurality of alignment holes in the material of the body, wherein the alignment holes comprise fibre or other waveguide alignment holes aligned with one or more of the optical elements, and/or the alignment holes comprise alignment holes configured to receive mechanical elements for fixing and/or aligning the body to at least one further body.

The method may comprise forming the optical elements and the alignment holes by at least one of:

a) laser modification of the material followed by removing laser-modified material following the laser modification;

b) laser ablation.

The laser modification of the material and/or laser ablation may comprise a laser processing procedure that comprises holding the body in position using a sample stage and providing relative movement between a laser beam and the sample stage. Laser modification of material and/or laser ablation for formation of both the optical elements and the alignment holes may be performed during the same laser processing procedure.

The laser modification of material for formation of both the optical elements and the alignment holes may be performed without removing the body from the sample stage.

The method may comprise subsequently applying etchant to the material.

The method may comprise subsequently inserting fibres or other waveguides into at least some of the alignment holes.

The method may comprise applying adhesive to adhere fibres or other waveguides in, or to surfaces of, the alignment holes. The method may comprise inserting at least one mechanical element into at least one of the alignment holes, for example to fix and/or align the body to at least one further body.

In a further aspect, which may be provided independently, there is provided an optical system comprising:

optical apparatus comprising:
a body comprising material;
a plurality of optical elements formed of the material of the body; and
a plurality of alignment holes formed in the material of the body, the alignment holes comprise alignment holes configured to receive mechanical elements for fixing and/or aligning the body to at least one further body; and the optical system further comprises:

fibres or other waveguides inserted into at least some of the alignment holes and aligned with the optical elements; and/or at least one mechanical element inserted in at least one of the alignment holes for fixing and/or aligning the body to at least one further body.

The optical system may comprise at least one further optical apparatus, the at least one further optical apparatus optionally being as claimed or described herein, wherein the optical apparatus and the at least one further optical apparatus may form a stacked structure and are fixed and/or aligned by said at least one mechanical element.

In a further aspect, which may be provided independently, there is provided a monolithic glass device comprised of mechanical passive alignment features such as fibre alignment channels along with an array of microlenses to collimate or focus the light emitted or received by the fibres.

By producing fibre alignment arrays using laser based micromachining techniques, for example laser ablation and/or laser processing followed by material removal, and combining this with microlenses made using the same process in the same substrate, a monolithic piece can be produced which can significantly simplify the manufacturing of lens-coupled fibre arrays.

Features in one aspect may be provided as features in any other aspect. For example, any one of apparatus, method or system features may be provided as any one or more other of apparatus, method or system features. A.

BRIEF DESCRIPTION OF THE DRAWINGS

Embodiments of the invention are now described, by way of non-limiting examples, and are illustrated in the following figures, in which:—

DETAILED DESCRIPTION

Figure 1:
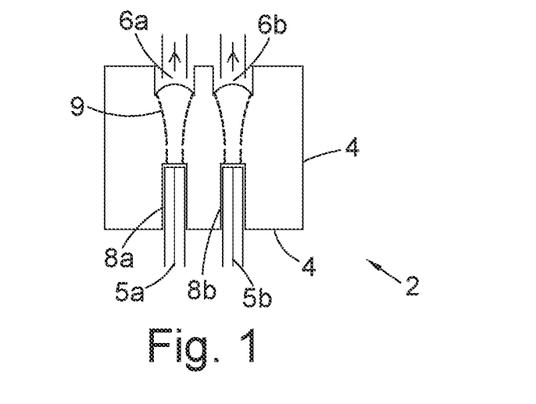
FIG. 1 is a schematic illustration of an optical apparatus according to an embodiment.

FIG. 1 is an illustration of an optical apparatus 2 according to an embodiment. The apparatus comprises a body in the form of a monolithic block of material 4 in which is formed a plurality of lenses 6a, 6b, and a plurality of alignment holes 8a, 8b.

In FIG. 1, optical fibres 5a, 5b are shown inserted into the alignment holes 8a, 8b. The alignment holes are aligned with the lenses 6a, 6b and the end faces of the alignment holes are perpendicular to a longitudinal axis of the alignment holes.

The alignment of the alignment holes 8a, 8b and lenses 6a, 6b is such that light, for example light of a desired wavelength, transmitted through the end faces of the alignment holes 8a, 8b in a desired direction, for instance a direction parallel to the longitudinal axes of the alignment holes 8a, 8b, is transmitted to the lenses 6a, 6b.

For instance, when the optical fibres 5a, 5b are inserted into the alignment holes to a desired position, for example with end faces of the fibres abutting or adjacent to the end faces of the alignment holes, light emitted by the optical fibres propagates to the lenses 5a, 5b. Optical axes of the lenses are aligned with the alignment holes in some embodiments. In the embodiment of FIG. 1, the end faces of the alignment holes are perpendicular to a longitudinal axis of the alignment holes.

The light can be of any desired wavelength and may for example be visible light.

The embodiment of FIG. 1 includes lenses 6a, 6b but in alternative embodiments, any suitable refractive, diffractive or reflective optical elements or metalenses may be provided instead of as well as lenses. For example, mirrors may be provided instead of lenses. The lenses 6a, 6b are spherical lenses but any other suitable type of lenses can be provided in other embodiments. Either concave, convex or any other suitable shape of lens may be used in various embodiments. Any suitable lens properties may be provided, for example focal lengths in a range 10 μm to 10 mm, diameter in a range 10 μm to 10 mm.

Although only two lenses 6a, 6b are shown in FIG. 1, any desired number of lenses or other optical elements and/or corresponding alignment holes may be formed of the material of the body, for example the monolithic block of material 4. The optical elements and the alignment holes can be provided in any suitable arrangement.

For example, in some embodiments the optical elements are formed in an array, optionally a 1D or 2D array. The array may comprise a regular array, with periodic spacing between the optical elements, or may comprise a non-regular array with non-periodic spacing between at least some of the optical elements.

Although optical fibres are shown in FIG. 1 any other suitable type of waveguide device may inserted into the alignment holes, for example in order to transmit or receive light to from the lenses or other optical elements with which the alignment holes are aligned.

Although light is transmitted from the optical fibres or other waveguide devices to the lenses or other optical elements in the embodiment of FIG. 1, in other embodiments or modes of operation light may be transmitted from the optical elements to the optical fibres or other waveguide devices.

In the embodiment of FIG. 1, the alignment holes have a constant diameter along their length, but in some embodiments the diameter of the alignment holes vary, for example taper, with position in a longitudinal direction. In some embodiments, a flared opening to each alignment hole is provided, which can assist in guiding insertion of fibre or other waveguide device. Any suitable length and diameter of the alignment holes can be provided, for example a diameter in a range 50 μm to 500 μm, for instance 81 μm or 126 μm, and a length in a range 0.25 mm to 5 mm.

It is a feature of the embodiment of FIG. 1 that the lenses 6a, 6b and the alignment holes 8a, 8b are formed by laser modification of the material, with laser modified material being removed following the laser modification (e.g. laser-induced selective etching) although in variants or alternative embodiments laser ablation may be used as well as or instead of such laser modification/etching or other subsequent selective removal. In particular, in the embodiment of FIG. 1, the material 4 is glass and the lenses 6a, 6b are made of the glass 4 using laser assisted wet chemical etching. Glass wafers or other body of any suitable material are irradiated with a focussed ultrashort pulsed laser to induce regions of enhanced chemical etch rate. The glass or other material is then placed in an etch solution (e.g. KOH or HF based) and the regions which have been irradiated etch preferentially with respect to the surrounding material. After etching, the microlens surfaces are post-processed to improve the surface quality, which can consist of a CO2 laser polishing process, a flame polishing process or a chemical smoothing process.

The alignment holes 8a, 8b are also formed in the glass using the laser assisted wet chemical etching process, and the alignment holes 8a, 8b and the lenses 6a, 6b are formed using the same laser processing procedure. For example, the laser modification of the material may comprise a laser processing procedure that comprises holding the body in position using a sample stage and providing relative movement between a laser beam and the sample stage, with laser modification of material for formation of both the optical elements and the alignment holes is performed during the same laser processing procedure. The laser modification of material for formation of both the optical elements and the alignment holes can be performed without moving or removing the body with respect to or from the sample stage.

By forming both the lenses or other optical elements and the alignment holes during the same laser processing procedure, desired positioning and alignment of the optical elements and the alignment holes can be provided in a particularly efficient manner, and the use of the alignment holes in turn enables straightforward and accurate alignment of the optical fibres or other waveguide devices with lenses or other optical elements, lenses or other optical elements, by insertion of the optical fibres or other waveguide devices into the alignment holes.

The accurate positioning and formation of the lenses or other optical elements, and the alignment holes, that can be provided by the laser processing procedure, and the removal of the need for subsequent, separate alignment procedures can also enable a wide variety of arrangements or properties of lenses or other optical elements and/or associated alignment holes to be provided without increase in complexity associated with alignment procedures.

For example, due to the flexibility of the laser manufacturing process, arrays with differing fibre alignment holes can be accommodated e.g. smaller and larger holes for different fibre (or other waveguide) diameters or types. Other mechanical alignment features for passive alignment with other components can also be provided if desired.

In alternative embodiments, the laser processing can comprise laser ablation as well as or instead of laser modification of material properties followed by etching, or any other suitable laser processing technique. In some such embodiments, the glass body or other material may be maintained in the same position on a sample stage or similar structure whilst the laser ablation to produce both optical elements and alignment holes is performed. Any suitable known laser ablation technique may be used.

Further properties and arrangements of lenses or other optical elements, and associated alignment holes, according to further embodiments are discussed in relation to FIGS. 2 to 7.

Figure 2:
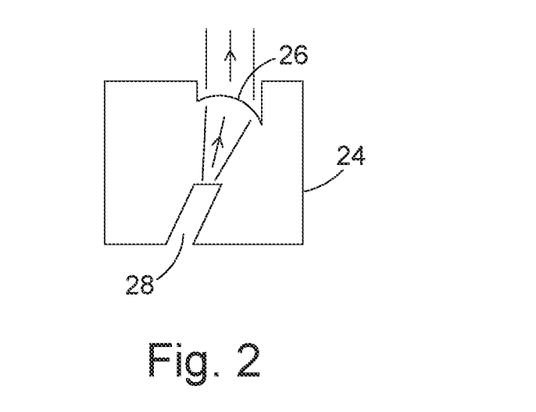
FIG. 2 is a schematic illustration of an optical apparatus according to a further embodiment, which includes angled channels.

In the embodiment of FIG. 2, alignment holes 28 and lenses 26 are formed in a body comprising a block of material 24 using the or a laser processing procedure. The alignment holes 28 are in the form of angled fibre channels and the lenses 26 are aspheric lenses. The lenses are also tilted with respect to the body, in this case with respect to the surface of the body on which they are formed. Although only a single lens 26 and corresponding single alignment hole 28 is shown in FIG. 2, an array of the lenses 26 and alignment holes 28 is provided in the embodiment.

In the embodiment of FIG. 2, angled fibre channels with aspheric lens surfaces and tilted lenses are provided. By angling the fibre alignment channel and creating an appropriate aspheric lens surface, a low back reflection array can be achieved. In applications where low back reflections are important, other configurations can be provided in further embodiments which also allow suppression of back reflection.

Figure 3:
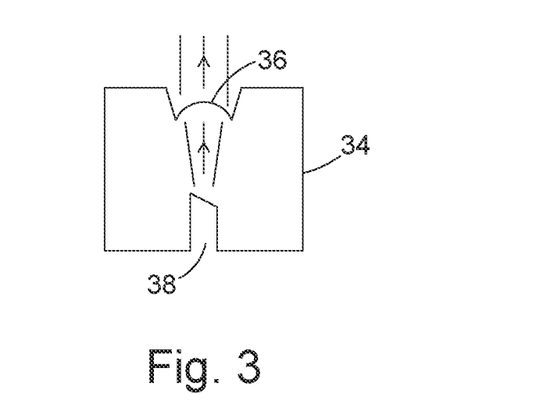
FIG. 3 is a schematic illustration of an optical apparatus according to a further embodiment, which included angled channel end faces.

FIG. 3 is a schematic illustration of part of an optical apparatus according to an embodiment, which also uses angling to reduce back reflection. In this embodiment, alignment holes 38 and lenses 36 are formed in a body comprising a block of material 34 using the or a laser processing procedure. The lenses 36 are spherical lenses, and the holes 38 are in the form of straight channels perpendicular to the surface on which the lenses 36 are provided and aligned with the lenses 36. In this embodiment, the end-faces of the channels 38 are angled with respect to the walls/longitudinal axis of the channels and/or with respect to a line joining the centre of the end-face with the centre of the corresponding lens 36. The end faces may be inclined at any suitable angle with respect to the walls/longitudinal axis to reduce back reflection, for instance any angle in a range 1 degree to 45 degrees, for example 8 degrees.

An optical adhesive with suitable refractive index for the wavelengths of light of interest is used in the embodiment of FIG. 3 to attach fibres or other waveguide devices within the holes 38. The angling of the end faces of the alignment holes 38 can provide a low back reflection array.

Although only a single lens 36 and corresponding single alignment hole 38 is shown in FIG. 2, an array of the lenses 36 and alignment holes 38 is provided in the embodiment.

As well as providing aligned fibre or other waveguide alignment holes, and associated lenses or other optical elements, certain embodiments included additional structures formed in the body, for example using laser processing. For example, in some embodiments modifications to structure are made to enable adhesive flow and/or venting, and/or to aid etch formation of structures.

Figure 4:
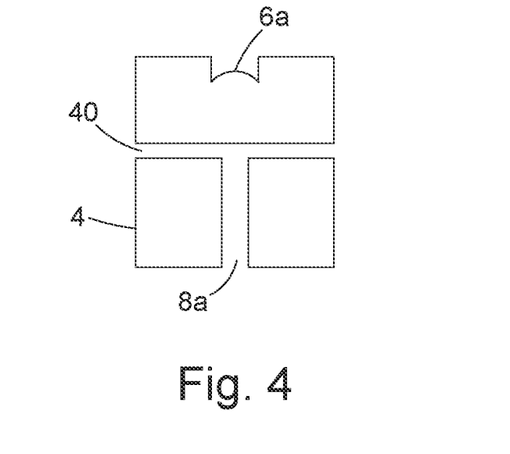
FIGS. 4 to 6 are schematic illustrations of optical apparatus according to further embodiments, which include additional channels for example for etchant access and/or adhesive flow.

An example of one such embodiment is shown in FIG. 4, which is a variant of the embodiment of FIG. 1 in which channel(s) 40 for enhanced etchant access during processing and for subsequent adhesive flow during assembly (e.g. insertion of fibres or other waveguide devices into the holes 8a, 8b and application of adhesive to fix them in place). For example, etchant and, subsequently, excess adhesive can escape or at least flow away from the holes 8a, 8b via the channel(s) 40.

In the embodiment of FIG. 4, a single channel 40 can connect multiple alignment holes, for example at least alignment holes 8a, 8b. In alternative embodiments, a plurality of channels can be provided each connected to one, or a respective plurality, of the alignment holes, for example adjacent fibre channels. A plane may effectively be formed at the endfaces of the fibre channels by a surface of the channel 40. The or each channel 40 may, for example, exit the body at a side face.

Figure 5:
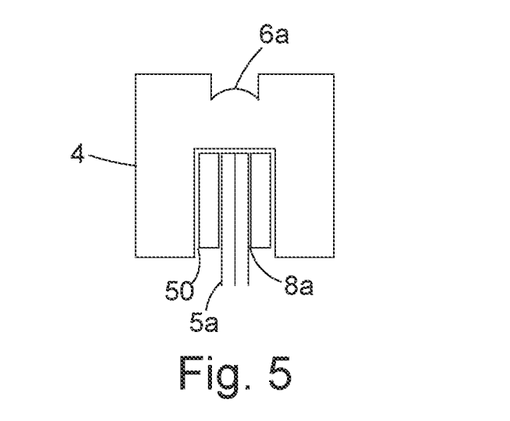

A further embodiment is illustrated in FIG. 5, and is a variant of the embodiment of FIG. 1 in which vent hole(s) 50 are provided which connect to the alignment hole 8a. As well as allowing etchant access, the vent hole(s) can also be used for insertion of adhesive to adhere the fibre 5a or other waveguide device in the alignment hole 8a.

Figure 6:
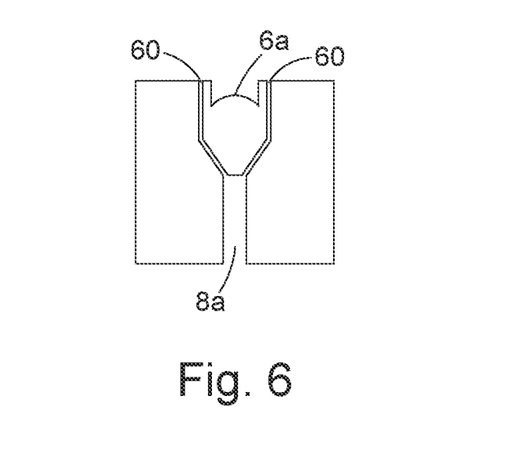

A further embodiment is illustrated in FIG. 6, and is a variant of the embodiment of FIG. 1 in which vent hole(s) 60 are provided which connect to the alignment hole 8a. As well as allowing etchant access, the vent hole(s) 60 can also be used for insertion of adhesive to adhere the fibre 5a or other waveguide device in the alignment hole 8a. The embodiment of FIG. 6 is similar to that of FIG. 5, except that the vent hole(s) 60 connect the hole 8a to the surface on which the lens 6a or other optical device is provided rather than providing an additional path between the alignment hole 8a and the surface in which the alignment hole is formed.

Although, for clarity, only a single lens 6a and corresponding alignment hole 8a is shown in FIGS. 4 to 6, an array of the lenses and alignment holes is provided in the embodiments of FIGS. 4 to 6.

In the embodiments of FIGS. 1 to 6 the lenses or other optical elements are recessed below a surface of the material of the body, which can provide for a robust structure. The recess would generally not be filled but in some embodiments may be filled with an appropriate material e.g. epoxy, if required. Additional optical functionality, e.g. crosstalk suppression, may be provided in some embodiments by introducing a light absorbing layer at the sides of the recesses containing the lenses or other optical elements.

As well as or instead of alignment holes that can be used to align optical fibre or other waveguides with lenses or other optical elements, in some embodiments the apparatus includes alignment hole(s) that can be used to receive mechanical elements, for instance pins, for fixing and/or aligning the body to at least one further body. The alignment holes for receiving fixing/aligning elements can be formed using the same laser processing procedure as used to form the optical elements and waveguide alignment holes, for example a single laser processing procedure performed without removing the body from the sample stage, thus providing an efficient way to ensure correct positioning of the various alignment holes and optical elements.

Figure 7:
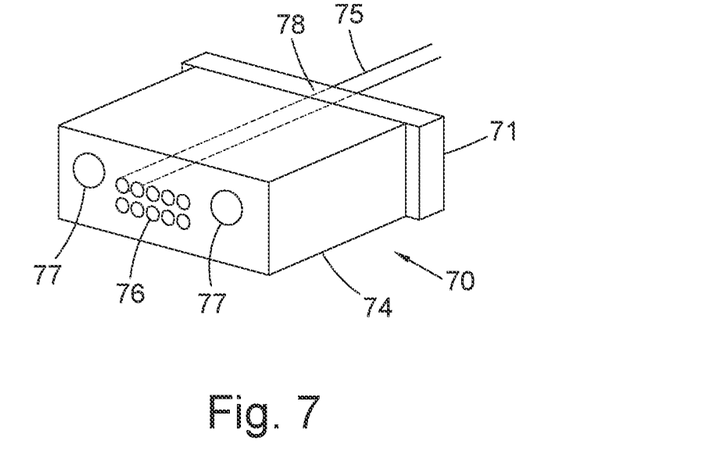
FIG. 7 is a schematic illustration of an optical apparatus according to a further embodiment.

An embodiment that includes alignment holes for fixing/alignment elements is illustrated schematically in FIG. 7. The apparatus 70 of FIG. 7 includes a body 74 in which is formed alignment holes 78 (one shown by way of example) for receiving optical fibres 75 (one shown by way of example) and that align with an array of optical elements 76.

The apparatus 70 is an optical connector and includes a flange 71 for connector mating and alignment holes 77 for receipt of pins, for example MT connector pins or any other known or standard connector pins, that can be used to connect the apparatus 70 to a body of a further apparatus or structure. The body 74 is a monolithic piece of glass. The alignment holes 78 are simple blind holes and the optical elements 76 in this embodiment provide an expanded mode interface, although they can be used for any other purpose or to provide any other optical characteristics in alternative embodiments.

Figure 8A:
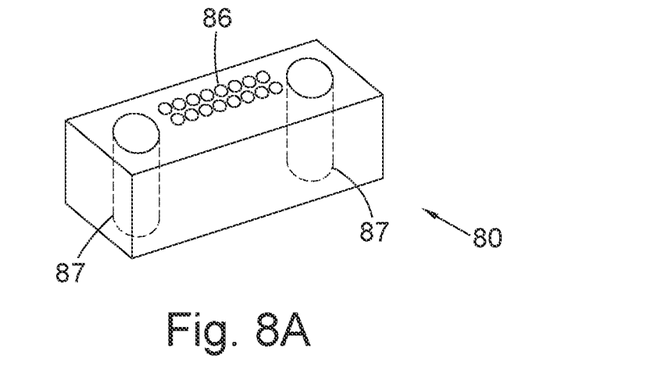
FIGS. 8a and 8b are schematic illustration of an optical apparatus according to a further embodiment, in the form of a connector insert with microlenses.
Figure 8B:
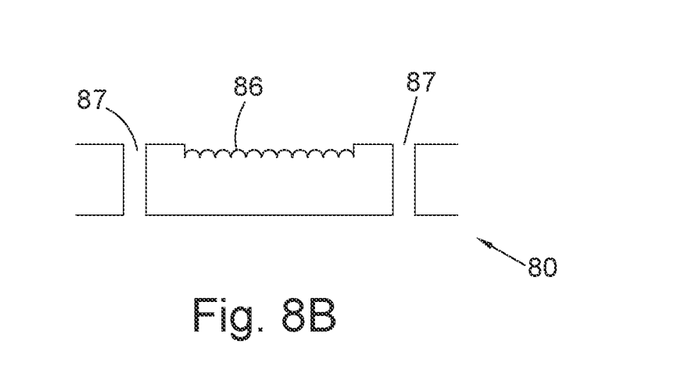

A further embodiment is illustrated in schematic perspective and side-on views in FIGS. 8A and 8B. The apparatus of FIGS. 8A and 8B is a connector insert with microlenses 86 and MT or other connector pin holes 87. In this embodiment, alignment holes for receiving optical fibres or other waveguides are not provided. The apparatus of FIGS. 8A and 8B enables assembly to existing connector ferrules, for example, to enable expanded mode capability.

Figure 9:
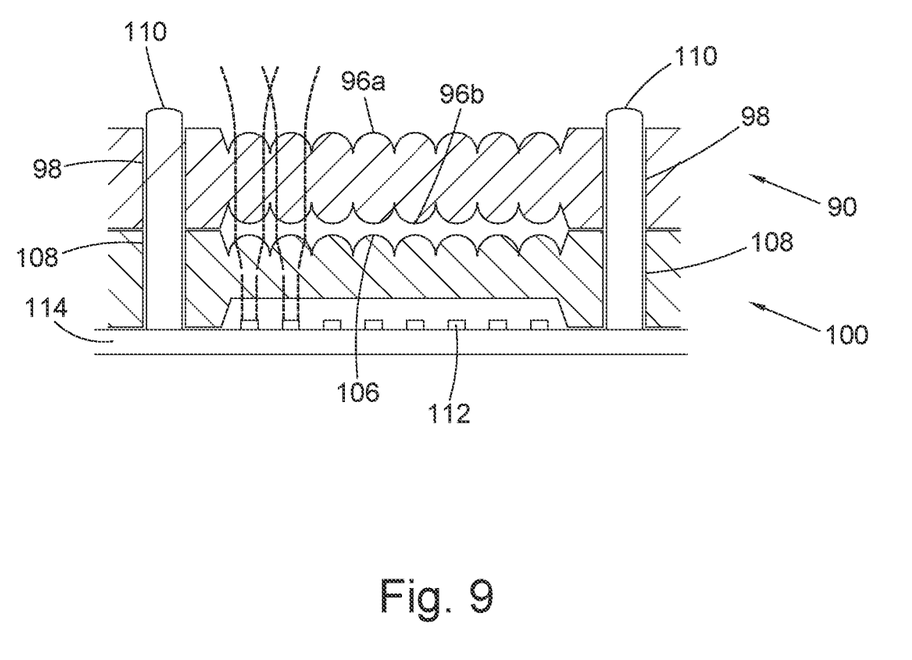
FIG. 9 is a schematic illustration of an optical apparatus according to a further embodiment, which forms part of a stackable, aligned microlens array.

Another embodiment is illustrated in FIG. 9, in which two devices 90, 100 are provided each formed using laser processing of a block of glass or other suitable material to produce arrays of microlenses or other optical elements 96a, 96b and 106 and to produce alignment holes 98, 108 through which pins 110 or other connection or alignment features can be inserted in order to connect and/or align the devices 90, 100. Thus, stackable passive aligned microlens (or other optical element) arrays can be provided with laser machined passive alignment features to allow easily assembled stacks. The alignment holes in this embodiment enable alignment of the optical elements 96a, 96b with the optical elements 106 and with an array of emitters/receivers 112 provided on substrate 114.

The alignment holes 77, 98, 108 are shown as closed holes surrounded by the material on all sides in lateral directions. In some embodiments, alignment holes may be at least partially open on one or more sides, for example if they are positioned at the edge of the body. Alignment holes may have any suitable shape, and are not limited to being circular only.

Apparatus according to some embodiments can provide, for example, an array of blind fibre alignment holes in substrate with correspondingly placed microlenses on the opposite facet. Fabricated in 1D or 2D arrays with flexible positioning of fibre holes, and manufactured at wafer scale or individual die scale.

Apparatus according to various embodiments can, for example, be standalone to create combinations of lenses e.g. fast axis and slow axis collimators. Apparatus according to various embodiments can, for example, be integrated into active sub-assemblies with arrays of emitters or receivers and/or can be applicable to arrays of discrete emitters e.g. VCSELS, microLEDs, edge emitter lasers, as well as photonic integrated circuits such as Silicon Photonic devices. Apparatus according to embodiments can in some cases be assembled on the wafer scale.

Apparatus according to embodiments can be used for a variety of applications, including but not limited to, optical fibre collimator arrays for optical switching, multichannel fibre optic connectors with expanded mode interfaces, phased arrays for LiDAR and free-space optical communications, passively aligned optics for optoelectronic modules such as transceivers or laser arrays.

Any suitable mechanical elements for connection and/or alignment can be used in embodiments, for example MTP/MPO guide pins with diameters of 700 um or 550 um.

Embodiments have been described in which the material of the body is glass. Any suitable material can be used according to embodiments, for example glasses such as silicates, borosilicates, doped or modified silicates, phosphate glasses, doped or modified phosphates, chalcogenide glasses, doped or modified chalcogenides, crystalline materials such lithium niobate, yttrium aluminium garnet and also doped, poled or modified crystals such as periodically poled lithium niobate or Neodymium doped yttrium aluminium garnet, laser or amplifier gain media such as rare earth doped glasses and crystals.

As mentioned above, it is a feature of some embodiments that the optical elements and the alignment holes can formed using laser modification of the material, with laser modified material being removed following the laser modification. Various examples of laser processing techniques according to embodiments, which may be used to produce the optical elements and the alignment holes are described in WO 2008/155548, WO 2011/154701, WO 2019/166803 and WO 2019/122914 the contents of which are hereby incorporated by reference.

Figure 10:
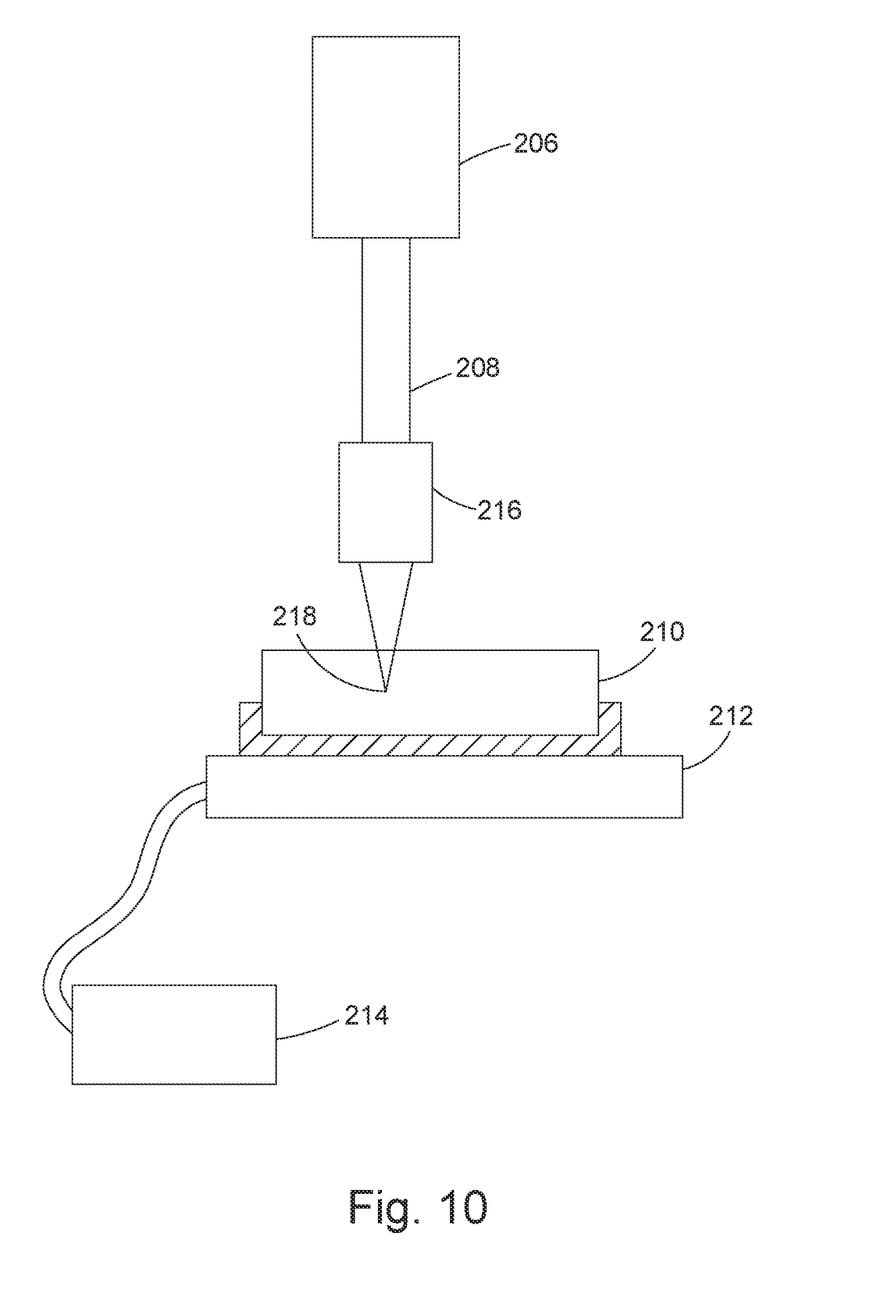
FIG. 10 shows a laser system for forming the optical structures and alignment holes in material of a body, for example a bulk sample, according to some embodiments.

FIG. 10 shows a laser system for forming the optical structures and alignment holes in material of a body, for example a bulk sample, according to some embodiments. The laser system comprises a laser 206 that, in this embodiment, has an associated acousto-optic modulator that can modulate a pulse train from the laser 206. The laser in this embodiment has an external compressor stage, for emitting a beam of laser radiation 208 for use in forming optical structures or holes in a radiation sensitive material 210, for example suitable glass or crystal material.

In the embodiment of FIG. 1, the material 210 is carried in a sample space on a stage structure 212 that can be moved under the control of a computer based control unit 214.

The control unit also controls operation of the laser 206.

In operation, the beam 208 is focused vertically down onto the material 210 by a lens system 216. The beam delivery may be mounted to a support structure (not shown) to minimize vibration and thermal movements. The beam reaches a focal point 218 at a point of the material 210. The translation of the sample through the focus results in laser modification of the material at desired positions and to provide desired effects. In alternative embodiments the substrate remains stationary and the laser beam is moved relative to the substrate.

Through tailoring of the laser parameters, for example under control of the control unit 214, such as power, polarization, pulse length, pulse repetition rate, wavelength and/or speed of translation, structures can be created with desired properties.

The laser parameters that are used depend on the material properties of the sample, and on the desired modifications. Examples of suitable laser processing parameters are provided in WO 2008/155548, WO 2011/154701, WO 2019/166803 and WO 2019/122914 the contents of which are hereby incorporated by reference. In some embodiments, pulse durations from 10 fs to 20 ps, for example 200 fs, pulse repetition rates from 1 kHz to 1 GHz, and pulse energies from 10 nJ to 1 mJ may be used, but any other suitable laser processing parameters may be used in accordance with known laser processing techniques.

By performing the laser processing for formation of both the optical elements and the alignment holes during the same laser processing procedure, for example, without removing the material 210 from, or altering its position on, the stage structure, accurate alignment of the optical elements and the alignment holes can be assured in an efficient manner as mentioned above. As mentioned above, the laser processing can comprise laser ablation as well as or instead of laser modification of material properties followed by etching, or any other suitable laser processing technique. Again, in such embodiments, the material 210 may be maintained in the same position on a sample stage or similar structure whilst the laser ablation and/or machining to produce both optical elements and alignment holes is performed.

Following laser processing by irradiating the material with a focussed ultrashort pulsed laser to induce regions of enhanced chemical etch rate, the glass is then placed in an etch solution (e.g. KOH or HF based) and the regions which have been irradiated etch preferentially with respect to the surrounding material. After etching, surfaces can be processed to improve the surface quality, which can for example consist of a CO2 laser polishing process, a flame polishing process or a chemical smoothing process, as mentioned above.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. Optical apparatus comprising:
   a body comprising material;
   a plurality of optical elements formed of the material of the body; and
   a plurality of alignment holes formed in the material of the body,
   wherein:
   the alignment holes comprise fibre or other waveguide alignment holes aligned with one or more of the optical elements;
   the body comprises a monolithic block of the material, and the plurality of optical elements and the alignment holes are formed in or of the material of the monolithic block;
   the body further includes at least one channel connected to one or more of the alignment holes, and the at least one channel is arranged to provide flow of adhesive or other filling and/or to provide flow of etchant; and
   a surface of the at least one channel provides an end face of at least one of the alignment holes.

2. Apparatus according to claim 1, wherein the optical elements comprise refractive, diffractive and/or reflective optical elements, and/or metalenses.

3. Apparatus according to claim 1, wherein the alignment holes comprise alignment holes configured to receive mechanical elements for fixing and/or aligning the body to at least one further body.

4. Apparatus according to claim 3, wherein the at least one further body comprises an array of further optical elements, and the alignment holes are arranged to provide a desired alignment between the plurality of optical elements and the array of further optical elements.

5. Apparatus according to claim 1, wherein at least some of the alignment holes have different diameters to at least some other of the alignment holes, thereby to accommodate different sizes of optical fibres or waveguide devices.

6. Apparatus according to claim 1, wherein the channel or, each of a plurality of the channels, is connected to a respective plurality of the alignment holes.

7. Apparatus according to claim 1, wherein the plurality of optical elements comprises an array of optical elements.

8. Apparatus according to claim 7, wherein the array comprises a regular array of optical elements, with a periodic spacing between the optical elements.

9. Apparatus according to claim 1, wherein the optical elements are arranged to provide at least one of:
   a) a collimator array, optionally for optical switching applications;
   b) an expanded mode interface, optionally for a multi-channel fibre-optic connector;
   c) a phased array, optionally for LiDAR or free-space optical communication;
   d) Aligned optics, optionally for optoelectronic applications, for example a transceiver or laser array.

10. Apparatus according to claim 1, wherein the plurality of optical elements comprises a plurality of lenses.

11. Apparatus according to claim 1, wherein at least one of the optical elements comprises at least one lens that is tilted with respect to a surface of the body.

12. Apparatus according to claim 11, wherein for the alignment hole(s) aligned with the tilted lens(es), an end face of the alignment hole is tilted with respect to a longitudinal axis of the alignment hole.

13. Apparatus according to claim 1, wherein:
   for at least some of the alignment holes, an end face of the alignment hole is perpendicular to a longitudinal axis of the alignment hole; and/or
   for at least some of the alignment holes, an end face of the alignment hole is tilted with respect to a longitudinal axis of the alignment hole.

14. A method of forming an optical apparatus comprising laser processing a body comprising material for formation of a plurality of optical elements of the material of the body and a plurality of alignment holes in the material of the body, wherein:
   the alignment holes comprise fibre or other waveguide alignment holes aligned with one or more of the optical elements, and/or
   the alignment holes comprise alignment holes configured to receive mechanical elements for fixing and/or aligning the body to at least one further body,
   the body comprises a monolithic block of the material,
   the optical elements and the alignment holes are both formed using laser modification of the material of the monolithic block and/or by laser ablation of the material of the monolithic block,
   the laser modification and/or laser ablation of the material comprises a laser processing procedure that comprises holding the monolithic block in position using a sample stage and providing relative movement between a laser beam and the sample stage, and wherein laser modification of material and/or laser ablation for formation of both the optical elements and the alignment holes is performed during the same laser processing procedure.

15. A method according to claim 14, wherein the laser modification of material and/or laser ablation for formation of both the optical elements and the alignment holes is performed without removing the body from the sample stage and/or without moving the body relative to the sample stage.

16. An optical system comprising:
   optical apparatus comprising:
      a body comprising material;
      a plurality of optical elements formed of the material of the body; and
      a plurality of alignment holes formed in the material of the body,
   the alignment holes comprise alignment holes configured to receive mechanical elements for fixing and/or aligning the body to at least one further body; and
   the optical system further comprises:
      fibres or other waveguides inserted into at least some of the alignment holes and aligned with the optical elements, wherein
   the body comprises a monolithic block of the material and the plurality of optical elements, and the alignment holes, are formed in or of the material of the monolithic block, the body further includes at least one channel connected to one or more of the alignment holes, and the at least one channel is arranged to provide flow of adhesive or other filling and/or to provide flow of etchant; and
a surface of the at least one channel provides an end face of at least one of the alignment holes.

\* \* \* \* \*